March 21, 1950
H. J. PASSINO ET AL
2,501,451
FRACTIONATION OF CASHEW NUT SHELL LIQUID
Filed Feb. 27, 1945
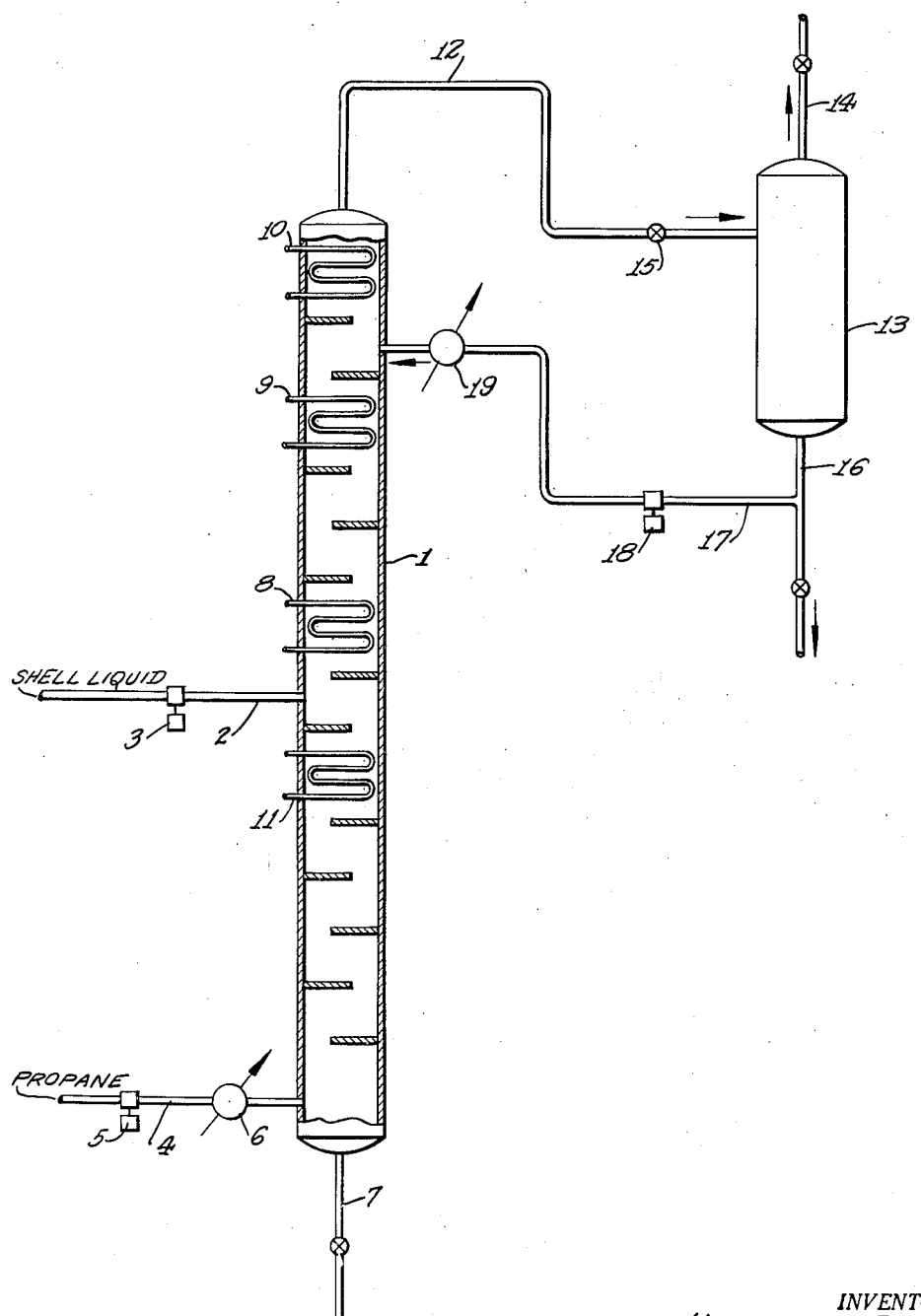
INVENTORS
HERBERT J. PASSINO
HERBERT B. LARNER
BY
E. F. Liebrecht
G. H. Palmer
ATTORNEY Patented Mar. 21, 1950

2,501,451

UNITED STATES PATENT OFFICE 2,501,451

FRACTIONATION OF CASHEW NUT SHELL LIQUID

Herbert J. Passino, Englewood, and Herbert B. Larner, Glen Ridge, N. J., assignors to The M. W. Kellogg Company, Jersey City, N. J., a corporation of Delaware Application February 27, 1945, Serial No. 579,966

2 Claims. (Cl. 260—624)

This invention relates to the treatment of mixtures of organic compounds comprising hydroxylated aromatic hydrocarbons. Such a mixture may comprise a hydroxylated aromatic hydrocarbon and other different organic compounds, or the mixture may comprise a plurality of hydroxylated aromatic hydrocarbons which differ from each other in molecular weight, in molecular structure, or in the number of hydroxyl groups per molecule. The invention relates particularly to the treatment of such a mixture to separate therefrom a fraction which is relatively concentrated in a desired hydroxylated aromatic hydrocarbon. Still more particularly the invention relates to an improved method for treating such a mixture consisting of compounds of relatively high molecular weight to separate therefrom a desired liquid.

The organic mixtures comprising hydroxylated aromatic compounds which may be treated in accordance with this invention are exemplified by cashew nut shell liquid. This is a mixture of relatively high molecular weight organic compounds obtained from the shells of the cashew nut. It is employed as an ingredient in numerous industrial products, such as resins and brake linings. The invention will be described in detail with reference to the refining of this liquid but it will be understood that the invention is applicable to the treatment of any similar mixture.

The method of this invention comprises the step of contacting the cashew nut shell liquid, or a similar mixture, with a relatively volatile solvent at a temperature in the range in which solubility of the shell liquid in the solvent decreases with rising temperature. This range of temperatures extends from a few degrees above the critical temperature of the solvent to approximately 150° F. below the critical temperature. In this temperature range the highly volatile solvents are very selective in the extraction of desired components from the shell liquid.

In order to operate at temperatures near the critical temperature of the solvent, and at the same time avoid relatively high temperatures which would produce some thermal effect on the shell liquid, it is necessary to employ solvents having relatively low critical temperatures. The solvents employed should be such as have critical temperatures not substantially higher than 450° F. and preferably lower than 325° F. Normally liquid solvents may be employed but the preferred solvents are the relatively low boiling normally gaseous solvents which are easy to separate from the extract. The preferred solvents include low boiling hydrocarbons, such as those of the paraffin and olefin series, and other solvents having relatively low critical temperatures, such as dimethyl ether, dichlordifluor methane, ammonia, methyl fluoride and halogenated hydrocarbons in general. The low boiling paraffin hydrocarbons are advantageous because they are stable and non-reactive with the liquid to be fractionated. The normally gaseous paraffins constitute a preferred class of solvents and among these propane is especially useful. In the further description of the invention propane will be referred to as the solvent. It will be understood, however, that propane exemplifies a large number of solvents which may be employed under proper conditions of temperature and pressure.

In carrying out the invention the cashew nut shell liquid is contacted with liquefied propane at a temperature within the range of temperatures in which miscibility of the shell liquid with propane decreases with rising temperature. When using propane this range of temperatures is between about 70° F. and 206° F. A pressure sufficiently high to maintain liquid conditions is applied to the operation. A relatively high ratio of propane to shell liquid is desirable, as greater selectivity in the extraction of the desired component is attained with high ratios of propane to liquid. The ratio should be at least 10:1, and ratios of 30:1, or higher, are highly desirable.

As greater proportions of the cashew nut shell liquid go into solution when using larger ratios of propane to shell liquid, it is evident that the temperature necessary to extract the desired proportion of the shell liquid depends upon the ratio of propane to shell liquid which is employed. This relationship is indicated by the results of certain experiments to determine the phase points of various mixtures of propane with a raw cashew nut shell liquid. In one such experiment the shell liquid was intimately mixed with propane in a ratio of propane to liquid of 10:1. At 84° F. this mixture formed two liquid phases, the upper, or extract, phase containing about 50% of the shell liquid. The lower phase was black in color whereas the extract phase was amber. On further heating the extract phase became lighter in color, indicating that the solubility of the shell liquid in the propane decreased with the temperature rise. In a similar experiment the raw shell liquid was mixed with propane in a ratio of 30:1. This mixture formed two phases upon being heated to 108° F. Under those conditions the bottoms phase was dark brown and the overhead phase was amber, but cloudy. Further heating to 135° F. cleared the extract phase, however, and this indicated that the solubility of the shell liquid in the propane decreased with the temperature rise. These experiments indicate that with the propane: liquid ratio of 10:1 a relatively low temperature should be employed to effect extraction of a substantial proportion of the shell liquid, whereas with the ratio of 30:1 a higher operating temperature is indicated.

The most important single component of cashew nut shell liquid, according to Harvey and Caplan (Ind. Eng. Chem., vol. 32, page 1306), is a mono-hydroxy phenol containing an attached side chain of 14 or 15 carbon atoms. This material, which is said to be anacardic acid, has a specific gravity of 0.930 and constitutes the effective ingredient of that portion of the shell liquid which is employed in the formation of resins, varnishes, brake linings, etc. The other ingredients of the shell liquid are principally those having a higher molecular weight and include one or more poly-hydroxy phenols. The latter are undesired ingredients in the commercial use of the shell liquid and they apparently are responsible for considerable skin irritation similar to the effect of poison ivy. An important part of the refining of the cashew nut shell liquid involves the separation of such poly-hydroxy phenols from the mono-hydroxy phenol. This has been effected commercially by a vacuum distillation treatment which recovers a relatively low proportion of the desirable component from the shell liquid in a distillate product which is but little lighter in color than the original dark liquid.

The following examples relate to propane extraction treatments of the raw cashew nut shell liquid and an acid treated cashew nut shell liquid.

Example I

A raw cashew nut shell liquid, having a specific gravity of 0.961 and an iodine number of 255, was contacted with liquid propane in a ratio of about 30 volumes of propane per volume of shell liquid. These ingredients were mixed in a bomb and the bomb temperature was then raised to 110° F., producing a bomb pressure of 195 pounds per square inch (gauge). At that temperature the mixture separated into two liquid phases. The upper, or extract phase, contained 44 weight per cent of the charged shell liquid and the lower phase contained 56% of the charge liquid, as well as a small proportion of propane. The two phases were separately withdrawn from the bomb and a shell liquid fraction was recovered from each. The extract fraction was lighter in color than the charge liquid and had a specific gravity of 0.932. The bottoms, or raffinate, fraction was very dark anad viscous and had a specific gravity of 0.985.

In another operation on another specimen of the same shell liquid sufficient propane was employed to provide a propane to shell liquid ratio of 50:1. The propane and liquid were charged to the bomb and the bomb temperature was raised to 125° F., to produce a bomb pressure of 240 pounds per square inch (gauge). Under these conditions the propane, or overhead, phase contained 55 weight per cent of the charge liquid, 45 weight per cent remaining in the bottom phase. The phases were again separately withdrawn and the shell liquid fractions recovered therefrom. The extract fraction was lighter in color than the charge liquid and had a specific gravity of 0.931 and an iodine number of 251. The bottoms fraction was very dark and viscous and had a specific gravity of 0.999.

Example II

An acid treated cashew nut shell liquid, having a specific gravity of 0.965 was contacted with liquid propane in a ratio of 30 volumes of propane per volume of shell liquid. The propane and shell liquid were mixed in a bomb and the temperature was then raised to 100° F., producing a bomb pressure of 170 pounds per square inch (gauge). At that temperature the upper, or extract, phase contained 39 weight per cent of the charge liquid, the remaining 61 weight per cent being in the bottom phase. The two phases were separately withdrawn from the bomb and a shell liquid fraction was recovered from each. The extract fraction was lighter in color than the charge liquid and had a specific gravity of 0.935. The bottoms, or raffinate, fraction was very dark and viscous and had a specific gravity of 0.985.

The color and specific gravities of the extract fractions recovered in the above experiments indicate a substantial concentration of the mono-hydroxy phenol, equivalent to the results obtained previously by vacuum distillation, in the extract, and a corresponding concentration of poly-hydroxy phenols in the raffinate. However, the new method is much simpler and the low temperatures at which it is carried out preclude the occurrence of polymerization, which is characteristic of the distillation operation.

The invention also includes within its scope the treatment of a mixture of cashew nut shell liquid with cashew nut kernel oil. In accordance with the present invention such mixtures, which are produced by certain methods of recovery of the shell liquid and the kernel oil, may be treated to separate a kernel oil fraction, a shell liquid fraction concentrated in the mono-hydroxy phenol, and a bottoms fraction. In accordance with this modification of the invention the oil and liquid mixture is contacted with the liquid propane at a substantially higher temperature than indicated by the above experiments to effect extraction of a relatively pure fraction of the kernel oil. The bottoms product from this operation would then be retreated at a lower temperature to separate a shell liquid extract fraction concentrated with the mono-hydroxy phenol.

While effective fractionation and refining of the shell liquid is accomplished by simple mixing of the propane with the liquid, in accordance with the foregoing examples, it is preferred to subject the shell liquid to counter-current contact with the propane to increase the efficiency of extraction. To further increase the degree of concentration of the desired component in the extract the extract phase is subjected to rectification. Preferably the extraction, or stripping, operation and the rectification treatment are carried out in the same zone. This method of operation will be described in more detail by reference to the accompanying drawing which is a diagrammatic view in elevation, partly in cross-section, of a combined stripping and rectification zone.

Referring to the drawing, the shell liquid is introduced continuously into the extraction tower 1 at an intermediate point thereof through line 2, which is provided with a pump 3. The liquid propane is introduced into the bottom of the tower through line 4, which is provided with a pump 5, and which passes through a cooler 6 to precool the propane to the temperature desired in the bottom of tower 1.

The propane flows upwardly in tower 1 as a substantially continuous phase. The shell liquid flows downwardly from line 2 in counter-current contact with the upwardly flowing propane stream. Suitable baffles, or other contact means, are provided in tower 1 to promote efficient contact of the counter-flowing liquid phases. The nature of the contact means and the upward velocity of the propane stream are carefully regulated to permit down flow of the lower phase in all parts of tower 1 at an effective rate.

Under normal conditions of operation the shell liquid introduced into tower 1 through line 2 is at most only partially dissolved at that point in the upwardly flowing propane stream. The undissolved portion flows downwardly in counter-current contact with the propane stream to the bottom of tower 1. During the flow of the shell liquid from line 2 to the bottom of tower 1 extensive stripping of the shell liquid by the propane solvent is effected. The temperature in the bottom of tower 1 is regulated to extract from the shell liquid all but that portion of the charge liquid which it is desired to reject as raffinate. The bottom phase, which contains a small proportion of the propane in solution, collects in the bottom of tower 1 and is withdrawn therefrom through line 7. The interface between the bottom phase and the propane phase may be maintained above or below the point of introduction of propane through line 4.

The portion of tower 1 below line 2 may be designated as the stripping zone and that portion above line 2 as the rectification zone, since in the latter zone the propane phase is treated to improve the concentration therein of the desired component. In general it may be said that rectification of the propane phase is accomplished above line 2 by lessening the solvent power of the propane phase for the less soluble constituents of the shell liquid as the propane phase passes upwardly from a point opposite line 2 to the top of tower 1.

In accordance with one method of effecting rectification, the propane phase is heated to a higher temperature above line 2 to effect precipitation of a portion of the previously dissolved shell liquid. Preferably a gradual temperature rise is brought about whereby there is continuous precipitation throughout the length of the rectification zone. The precipitated liquid, which includes some propane dissolved therein, flows downwardly through the rectification zone in intimate contact with the upwardly rising propane stream. This results in continuous precipitation, resolution and reprecipitation of shell liquid throughout the length of the rectification zone. As a result the selectivity of extraction of the desired component of the shell liquid is greatly improved.

The temperature rise in the rectification zone is brought about preferably by means of heating coils 8, 9 and 10 distributed along the length of the rectification zone to produce a gradual increase in temperature. Optionally one or more heating coils 11 may be located in the stripping zone to increase the efficiency of stripping. Tower 1 thus may be operated with a temperature gradient between a relatively low temperature in the bottom of the tower and a relatively high temperature in the top of the tower, the top and bottom temperatures being regulated to control distribution of the charge liquid between the products withdrawn at the top and bottom of tower 1. Ordinarily the temperature gradient is greatest between line 2 and the top of tower 1, although a uniform temperature gradient may be imposed on the tower. Furthermore, the stripping zone may be operated at a uniform temperature and the temperature gradient may be imposed only on the rectification zone.

In accordance with an alternative method of rectifying the propane phase, the latter, which is withdrawn from the upper part of tower 1 through line 12, is introduced into a separator 13. In separator 13 a substantial proportion of the propane is separated as a gas and withdrawn overhead through line 14. To effect this result the pressure may be reduced by means of valve 15 or heat may be applied in separator 13. Preferably both means are employed at the same time to produce in separator 13 a liquid containing a substantially reduced proportion of propane. This liquid is withdrawn from the bottom of separator 13 through line 16 and a portion thereof may be withdrawn from the system to recover the shell liquid fraction as the desired product. A portion of the liquid residue from separator 13 is diverted continuously through line 17 which connects with the upper part of tower 1. Line 17 is provided with a pump 18, for returning liquid against the pressure of tower 1, and temperature regulating means 19. Under normal conditions of operation the propane phase in the upper part of tower 1 is substantially saturated with shell liquid at the tower temperature. The shell liquid introduced through line 17 contains some components which are more soluble in the propane phase than some of the components already dissolved therein. As a result there is an immediate redistribution of shell liquid between the liquid phases. The more soluble components of the shell liquid from line 17 pass into solution and less soluble components of the shell liquid dissolved in the propane phase are precipitated. The lower liquid phase which is formed by the introduction of the shell liquid through line 17 flows downwardly in the rectification zone in counter-current contact with the propane phase and the redistribution of shell liquid components between the phases, with consequent improvement of the extract phase, is effected throughout the length of the rectification zone. To establish this operating condition all of the liquid residue separated in separator 13 may be returned to tower 1 through line 17 until the quality of extract recovered at 16 reaches the desired level. Thereafter a portion of the residue from separator 13 may be drawn off from the system through line 16 for recovery of the product therefrom.

While the two methods of rectifying the propane phase which are described above in connection with the drawing may be employed independently, it is evident that they may be applied at the same time with still greater improvement in the selectivity of the extraction treatment. That is, a substantial temperature gradient may be imposed on tower 1 in the rectification zone and at the same time the tower may be refluxed through line 17 in the manner described. The ratio of the shell liquid refluxed to the tower, through line 17, to the quantity withdrawn as product through line 16 depends upon the degree of fractionation desired and the presence or absence of a temperature gradient in tower 1. Ordinarily, however, it will be found that reflux ratios within the range of 0.5:1 to 20:1 are satisfactory.

We claim:

1. A method for separating mono-hydroxy alkyl phenols from cashew nut shell liquid which comprises contacting said liquid with an inert solvent having a critical temperature not substantially higher than 450° F., the conditions of temperature and pressure being effective to maintain said solvent in the liquid state, said temperature being within the range of not substantially higher than the critical temperature of the solvent and about 150° F. below said critical temperature so that the solubility of the compounds of said liquid decreases with rising temperature and so that only a portion of said liquid is dissolved in said solvent to form an extract phase, separating said extract phase from the undissolved portion of said liquid and recovering from said extract phase a portion of said liquid containing substantial quantities of said mono-hydroxy alkyl phenols.

2. A method as claimed in claim 1 in which the solvent is propane.

HERBERT J. PASSINO.
HERBERT B. LARNER.

REFERENCES CITED

The following references are of record in the file of this patent:

UNITED STATES PATENTS

| Number | Name | Date |
|---|---|---|
| 1,805,751 | Auerbach | May 19, 1931 |
| 2,022,256 | Schuler | Nov. 26, 1935 |
| 2,128,029 | Hendrey | Aug. 23, 1938 |
| 2,284,583 | Lewis | May 26, 1942 |